May 19, 1925.
H. C. ODEN
1,538,731
TEAT CUP FOR MILKING MACHINES
Filed July 28, 1919
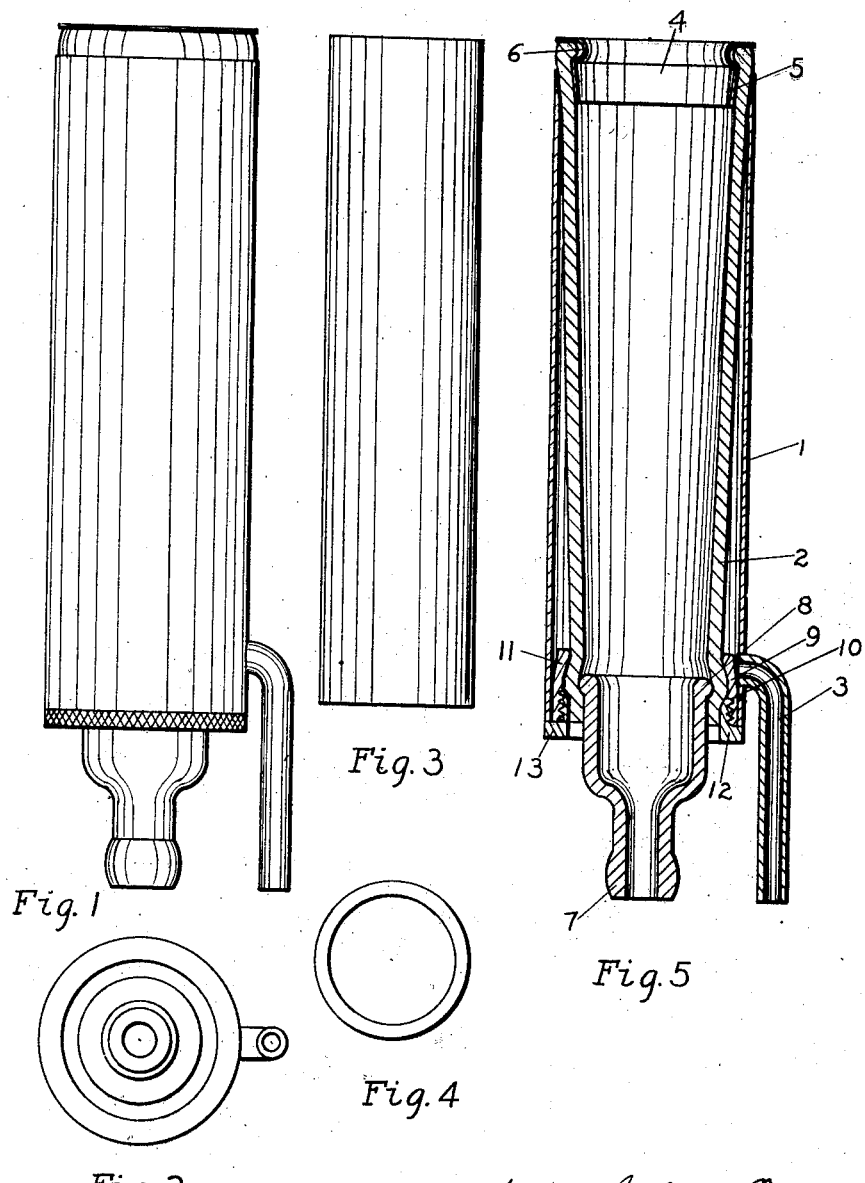

Patented May 19, 1925.

1,538,731

UNITED STATES PATENT OFFICE.

HENRY CLYDE ODEN, OF COLUMBUS, OHIO, ASSIGNOR, BY MESNE ASSIGNMENTS, TO PINE TREE MILKING MACHINE COMPANY.

TEAT CUP FOR MILKING MACHINES.

Application filed July 28, 1919. Serial No. 313,835.

*To all whom it may concern:*

Be it known that I, HENRY CLYDE ODEN, a citizen of the United States of America, residing at Columbus, in the county of Franklin and State of Ohio, have invented certain new and useful Improvements in Teat Cups for Milking Machines, of which the following is a specification.

My invention relates to a novel form of teat cup for milking machines. It aims to provide a practical and simple structure of teat cup which will permit the inspection of the milk coming from each teat before it mixes with the milk coming from the other teats.

Several attempts have been made to produce a teat cup that will correspond with these requirements but the structures have been such that the transparent element which is, almost of necessity fragile, has been subject to constant breakage under the normal operations connected with milking or connected with the cleansing of the teat cups. In addition, in these other structures, the transparent element has been insecurely held with the resultant danger of deficient operation. A teat cup of the type in question, to be practical, must be of relatively simple construction and must be so constructed that its parts may be readily assembled. These parts must be held in assembled relation in such a way that the transparent element will be firmly held and yet will be protected from undue strains.

I have provided a clamping device which is peculiarly suitable to that type of teat cup having a flexible inner cylinder. This is because, in my teat cup, the inner flexible cylinder is so related to the transparent element that all of the parts may be clamped together with a multiple clamping action and that the flexible cylinder member serves to fully protect the transparent element from binding contact with the metal of the teat cup, which binding contact inevitably increases the tendency to fracture of the transparent element whenever it is subjected to the jarring action that frequently occurs in the handling of devices of this character.

Most specifically, I have provided a teat cup embodying an outer rigid cylinder, an inner flexible cylinder, and a transparent nipple at the lower end of these cylinders together with a means for connecting these parts by a clamp that will exert pressure at several points rather than at one point, upon the transparent element.

I have further provided such a structure of teat cup that the metal cylinder can be made of minimum weight and yet there can be provided screw threads upon the inner lower end of such cylinder to facilitate adjustment of one of the clamping parts. It will be further seen as this description progresses that the parts of the teat cups are readily separable, may be easily adjusted to compensate for stretching of the inner flexible cylinder and are of such formation that they can be thoroughly cleansed without difficulty.

The preferred embodiment of my invention is shown in the accompanying drawings wherein similar characters of reference designate corresponding parts and wherein—

Figure 1 is a side elevation of my teat cup assembled.

Figure 2 is a bottom plan view of the structure shown in Figure 1.

Figure 3 is a side elevation of the inner flexible cylinder removed from the outer rigid cylinder.

Figure 4 is a section of the inner flexible cylinder shown in Figure 3.

Figure 5 is a vertical longitudinal section of the teat cup showing its parts in assembled relation.

In the drawings, the teat cup is shown as having an outer rigid cylinder 1 which is preferably of light material and an inner cylinder 2 of elastic material, preferably rubber. Extending into the side of the cylinder 1 at its base is a tube 3 designed to admit of the alternate introduction and exhaust of atmospheric air to and from the space between the rigid cylinder and the flexible cylinder.

At its upper end, the flexible cylinder 2 is slightly distended to embrace and retain an annular member 4 which is flared as at 5 and which has an annular depression 6 for the reception of the end of the cylinder 2.

At the lower end of the cylinders 1 and 2 there is provided a clamping connection between these cylinders 1 and 2 and the transparent nipple 7. This nipple 7 is designed for connection to the pipe which produces a partial vacuum and carries the milk to the desired point. The nipple 7 is preferably of clear glass so that the milk coming from each teat may be inspected as it passes to the pipe and at its inner or upper end this nipple is provided with a shoulder 8 slightly larger than the normal internal diameter of the lower end of the cylinder 2. In operation, the lower end of this cylinder 2 is expanded to embrace and tightly grip the shoulder 8.

Mounted within the rigid cylinder 1 at its lower end is a ring-like element 9 which is internally threaded as at 10 but which is slightly contracted above or within this threaded portion to produce an inclined shoulder 11 preferably extending entirely around the ring. It will be obvious that this ring-like member 9 may be threaded into the rigid cylinder 1 or it may be connected thereto in any suitable manner. For cooperation with this structure, I have provided an externally threaded ring member 12 designed to screw into the threads 10 of the ring member 9 and having a knurled shoulder 13 of substantially the same diameter as the rigid cylinder 1.

In assembling these parts, the elastic cylinder 2 is slightly distended to embrace the top ring 5 and fit in the groove 6 of such ring. The elastic cylinder is then placed within the rigid cylinder 1 and the lower end of this elastic cylinder is distended and placed over the shoulder 8 of the nipple 7 in the manner indicated in Figure 5. The result of this is to partially clamp the lower end of the elastic cylinder between the shoulder 8 on the nipple 7 and the inclined shoulder 11 on the ring-like member 9 owing to the elastic nature of the cylinder. Then the ring-like member 12 is screwed into position. The result is that the enlarged portion of the elastic cylinder 2 which exists because it is embracing the shoulder 8 of the nipple 7 is forced firmly into contact with the inclined shoulder 11 by the ring-like member 13. When this happens, the ring-like member 13 is exerting an upward and inclined force against the elastic member 2 and through it against the under outer surface of the shoulder 8. At the same time, a reactive force is being exerted by the inclined shoulder 11 against the elastic member 2 and through it to the upper outer surface of the shoulder 8. The result is that the shoulder 8 is firmly gripped from two sides by a clamping element which utilizes the elastic cylinder 2 as a protecting medium for the transparent and relatively fragile member 7. Not only this, but the clamping connection is such that the elastic member 2 may be cut off as it stretches and without difficulty replaced in its proper protective relation to the transparent member. As a matter of fact, either end of the elastic member may be cut off when desired, due to the fact that this member is of cylindrical form throughout and is not otherwise specially molded to embrace any particular element.

Having thus described my invention, what I claim is:

A teat cup comprising a removable transparent nipple bottom, an external shoulder on said bottom, an external rigid casing, an internal elastic cylinder fitting over said shoulder on said nipple bottom, an internal shoulder member positioned adjacent the lower end of said casing and adapted to engage said elastic cylinder, internal screw threads on the lower end of said member and an externally threaded plug adapted to be screwed into said internal threads so as to clamp said external shoulder and the elastic cylinder fitting thereover between said plug on one side and said internal shoulder on the other side.

In testimony whereof I hereby affix my signature.

HENRY CLYDE ODEN.